United States Patent [19]

Patel et al.

[11] 4,224,381
[45] Sep. 23, 1980

[54] ABRASION RESISTANT MAGNETIC RECORD MEMBERS

[75] Inventors: Pravin K. Patel, Los Angeles; David H. Johnston, Redondo Beach, both of Calif.; John Makaeff, deceased, late of Los Angeles, Calif., by Madeleine Makaeff, legal representative

[73] Assignee: Poly Disc Systems, Inc., Torrance, Calif.

[21] Appl. No.: 918,729

[22] Filed: Oct. 19, 1978

Related U.S. Application Data

[63] Continuation-in-part of Ser. No. 918,911, Jun. 26, 1978, abandoned, which is a continuation of Ser. No. 498,952, Aug. 20, 1974, abandoned.

[51] Int. Cl.$^2$ .................................. B32B 15/08
[52] U.S. Cl. .................................. 428/652; 427/130; 427/131; 427/132; 428/670; 428/671; 428/672; 428/673; 428/680; 428/926; 428/928
[58] Field of Search .......... 427/130, 131, 132; 428/668, 670, 671, 672, 673, 678, 679, 680, 928, 652, 926

[56] References Cited

U.S. PATENT DOCUMENTS

| | | | |
|---|---|---|---|
| 3,578,571 | 5/1971 | McQuaid et al. | 428/928 |
| 3,595,630 | 3/1971 | Wilhelm et al. | 428/624 |
| 3,634,209 | 1/1972 | Wolf et al. | 204/40 |
| 3,702,239 | 11/1972 | Nagy et al. | 428/626 |
| 3,738,818 | 6/1973 | Stone et al. | 428/928 |

Primary Examiner—L. Dewayne Rutledge
Assistant Examiner—W. G. Saba
Attorney, Agent, or Firm—K. H. Boswell; Edward D. O'Brian

[57] ABSTRACT

A new and improved magnetic recording disk can be prepared by interposing between an aluminum substrate disk and a recording alloy layer a support layer located on the substrate disk and a shield layer located between the support layer and the recording layer. The support layer is a hard, semi-crystalline nickel alloy layer having magnetic properties which is of such a character that if it is contacted by a recording head during the use of the disk it will tend to form a powder which will not interfere with subsequent use of the disk or recording head. The shield layer is of a nonmagnetic metal and serves to reflect signals from the recording head so that they do not reach the support layer. The support layer is created by forming an electroless nickel alloy deposit in the substrate and subsequently heating this deposit at a temperature which will not cause warpage of the substrate but which cause the deposit to change to a desired physical form while concurrently causing diffusion of nickel into the substrate. Such diffusion has the effect of increasing the amount of the alloying element in the support layer and firmly bonding the support layer to the substrate.

15 Claims, 1 Drawing Figure

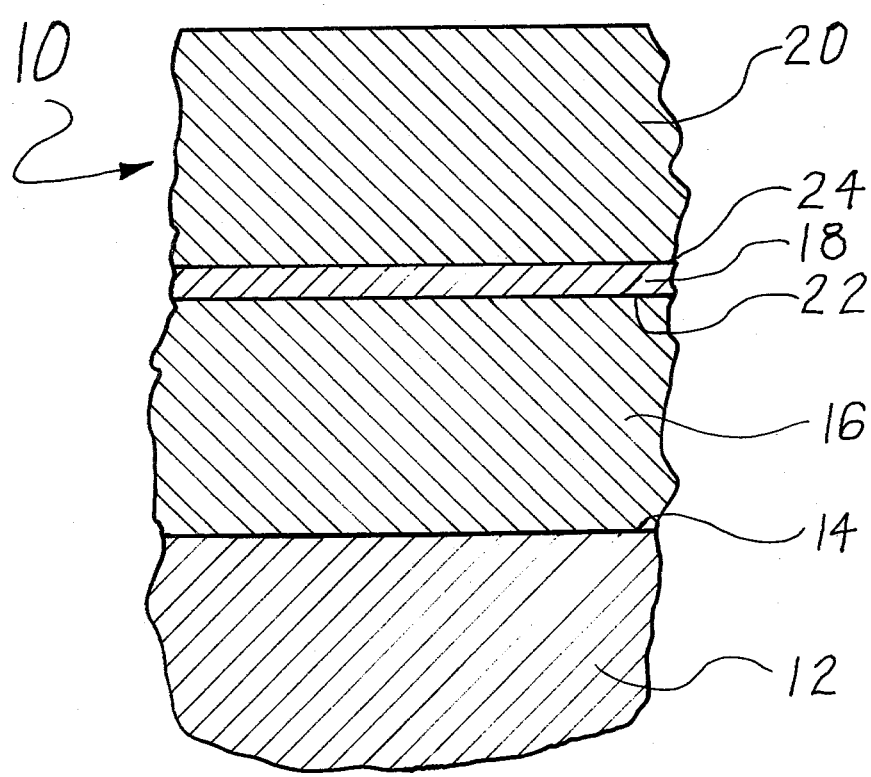

ABRASION RESISTANT MAGNETIC RECORD MEMBERS

This application is a continuation-in-part of our prior application Ser. No. 918,911 filed June 26, 1978, now abandoned and entitled "ABRASION RESISTANT MAGNETIC RECORD MEMBERS", the entire disclosure of which is herein incorporated by reference, which application in turn is a continuation of application Ser. No. 498,952, filed Aug. 20, 1974, now abandoned, and entitled, "ABRASION RESISTANT MAGNETIC RECORD MEMBERS", the entire disclosure of which is herein incorporated by reference.

BACKGROUND OF THE INVENTION

The invention set forth in this specification pertains to new and improved magnetic recording members and a process for preparing the same. More specifically the new and improved magnetic recording members are those members commonly utilized in conjunction with various types of computers. These recording members are normally of a disk shape and are provided with a layer of a magnetic recording alloy which is utilized to store information bits.

One of the problems encountered in connection with magnetic recording members concerns the loss of data stored in those members by damage to the member. If the recording alloy on the member is not of a uniform character the recording member will not operate in the desired manner. In the use of these members there is always the danger present that the surface of such members will be subject to abrasion which can cause disturbance of the magnetic recording alloy layer on such a member and subsequently loss of the information stored in that particular portion of the magnetic recording alloy. Abrasion of the magnetic recording alloy of course can be the consequence of improper handling. However, damage to the member more often is the result of the consequence of contact of the transducer head with the recording member.

The transducer or recording head used to enter and retrieve information from the recording members can be constructed of ceramic, glass or ferrite. These transducers or heads often can weigh upwards of one pound and can be "flown" across the surface of the recording member from a distance ranging from direct contact to 100 microinches. The transducers fly across a recording member at very high speeds and should the transducer inadvertently contact the member, damage to the member can result.

In order to protect the recording member and the information stored therein many different expedients have been resorted to. These include surface treatment of the magnetic recording alloy layer and/or location upon such a layer of a protective coat. Additionally, hard support layers have been used. However, presently known hard support layers suffer from the disadvantage that the composition is such that should a transducer strike the recording member the support layers shatter and the damage from the initial point of contact from the transducer is propagated to the areas surrounding the point of contact and result in what is termed as "catastrophic loss" of all the information affected by the propagation of the contact. In view of the above it is considered that there still exists a need for improvements in protecting the surfaces of magnetic recording members against abrasion or the like such that the recording characteristics and information retained on such members are not detrimentally affected.

SUMMARY OF THE INVENTION

It is a broad object of the present invention to provide magnetic recording members or structures and a process for preparing the same which are considered to meet this need. It is a further object of the present invention to provide magnetic recording members or structures such as memory disks which are relatively resistant to abrasion and yet which have desirable magnetic recording characteristics. A further object of the invention is to provide a process for the production of recording members or structures which is easily and conveniently practiced at a comparatively nominal cost.

In accordance with this invention these and other objects are achieved by providing improved magnetic recording members and a process of preparing the same which comprises: electrolessly depositing upon a substrate surface an amorphous nonmagnetic layer of from about 50 microinches to about 800 microinches of a nickel alloy consisting of nickel alloyed with an alloying element chosen from the group of phosphorus, boron, cobalt, and tungsten, said amorphous nonmagnetic layer being deposited upon the substrate layer in an electroless bath which is continually maintained rich with respect to the alloying elements, and after depositing said amorphous nonmagnetic layer heating this layer and the substrate at from about 500° F. to about 620° F. for about one hour to about eight hours to convert the amorphous nonmagnetic layer into a hard, semi-crystalline magnetic support layer which has the unique property of being richer in nickel near the interface of the substrate and the support layer and richer in the alloying element distal to the interface of the substrate and support layer and plating the support layer with a nonferrous, nonferromagnetic shield layer and further plating the shield layer with a nonmagnetic recording layer and heating the sandwich consisting of the substrate, the support layer, and the nonmagnetic recording layer at from about 500° F. to about 600° F. for about one hour to about three hours to convert the nonmagnetic recording layer into a magnetic recording layer.

BRIEF DESCRIPTION OF THE DRAWING

The invention involves many detailed aspects and considerations which cannot be effectively indicated by the aforegoing brief summary. Further details relative to this invention are best indicated with reference to the accompanying schematic drawing in which:

The FIGURE illustrates the nature of an abrasion resistant magnetic recording member prepared in accordance with the process of this invention.

DETAILED DESCRIPTION

An abrasion resistant magnetic recording member 10 in accordance with this invention includes a conventional substrate 12 as indicated in the drawing. This substrate 12 will normally be in the shape of a large disk. Generally the substrate will normally be constructed of aluminum although other nonmagnetic materials can also be used. Insomuch as the sole purpose of the substrate 12 is to provide a physical support for the remainder of the structure of the recording member 10 in accordance with this invention, it is not considered necessary for the purposes of this specification to elaborately detail the substrate 12.

The substrate 12 has a surface 14 which carries a support layer 16. This layer 16 is paramount to the invention as is the process used in forming this layer 16. The layer 16 is intended to be physically hard and resistant to abrasion and to provide a protective reinforcement for the subsequent shield layer 18 located upon the support layer 16 and recording alloy layer 20 in turn located upon the shield layer 18. By utilizing the process of the instant invention the three layers 16, 18 and 20 are produced such that they are free from any physical irregularities. Further, the interfaces between these three layers 16, 18 and 20 are such that there is an intimate physical contact between the respective layers.

The support layer 16 is preferably composed of a composition selected from the group consisting of nickel, nickel phosphorus alloys, nickel boron alloys, nickel cobalt alloys, and nickel tungsten alloys. A more preferred group is nickel phosphorus alloys and nickel boron alloys, and an even more preferred alloy is a nickel phosphorus alloy. In any of such alloys the amount of the element other than nickel, i.e., the non-nickel alloying elment, should be determined so that to use an effective amount of such an alloying element which will produce on the support layer 16 a surface structure which is comparatively physically resistant to abrasion and/or deformation and which if contacted with the transducer head will be relatively resistant to furrow formation and if impacted with sufficient force will not crinkle or gall but instead will powder, thus limiting the damage or discontinuity caused by such impact to only the impact area.

The amount of the alloying elements necessary to achieve this type of physical surface structure will vary depending on the specific alloying element chosen. In the presently preferred embodiment of the invention it is considered preferable to use about six percent by weight to about 13 percent by weight phosphorus as an alloying element. The percentage of the elements boron, cobalt or tungsten utilized in other embodiments can similarly be varied to a reasonable extent within the dictates of the plating process hereinafter described. Alloys having several alloying elements alloyed with nickel can, of course, be used. The presence of other metals in such an alloy in trace quantities which do not affect the physical properties of the support layer 16 can also be tolerated.

It is preferred to deposit the support layer 16 used in accordance with this invention by electroless plating techniques utilizing certain perameters as hereinafter described so as plated, the layer 16 will have a thickness of from about 50 to about 800 microinches. Depending on the final recording member and the other components with which it will be utilized, e.g., the transducer head, the thickness of the layer will be varied. For most applications the layer will be from about 300 microinches to about 600 microinches. The method of depositing the support layer using an electroless plating technique is preferred for economic reasons and because it can be adequately controlled to obtain a deposit which on heating develops magnetic properties. These magnetic properties define a change in the physical state of this layer.

If the layer created in this manner is thinner than about 50 microinches there is danger that this layer 16 will not be a continuous layer free from irregularities. More important, however, is the fact that if this layer were any thinner, there would be problems in subsequently treating it so as to develop the desired physical properties in the surface of the layer 16. On the other hand, if the layer 16 is any thicker than 800 microinches it is relatively difficult to control the subsequent treatment of this layer 16 to produce the desired physical properties. A layer thicker than 800 microinches would be very magnetic and require an extremely thick layer of shield film. This would ultimately reduce the hardness and/or toughness of the final recording member by introducing too great a layer of a softer shield layer.

The development of the physical properties desired in the final layer 16 produced by an electroless plating technique requires heating after plating. As plated in this manner the layer 16 is an amorphous, nonmagnetic layer. To convert this amorphous nonmagnetic layer into a hard, semi-crystalline layer which is resistant to abrasion and will not tend to furrow if scratched, the layer is heated. This conversion is accomplished by what can be regarded as moderate heat at a time and temperature which is effective to cause the amorphous material to change in internal structure so that the amorphous material becomes physically hard and resistant. The change from the amorphous state to the semi-crystalline state is accompanied by a change from a nonmagnetic state to a magnetic state and involves a time and temperature relationship. In general the higher the temperature the shorter the time required and the lower the temperature the longer the time required. However, the time-temperature relationship also includes a dependence upon the layer thickness as hereinafter described.

In a nickel phosphorus layer produced by electroless plating containing the percentages of phosphorus as indicated in the preceding the composition is preferably heated at a temperature from about 500° F. to about 620° F. for about one hour to about eight hours. This is well below the point at which the metal material would melt and form a liquid alloy with the aluminum substrate layer and below the temperature at which any heat caused deformation of the aluminum substrate could occur. During heating it is preferred that the substrate 12 and the support layer 16 be heated in an inert atmosphere or in an atmosphere which is isolated from ambient air. An inert atmosphere is utilized so as to avoid oxide formations. If heating is done in an enclosed atmosphere isolated from ambient air the amount of oxide formation will normally be so limited so as not to have any detrimental effect.

It is most preferable to heat a nickel or a nickel phosphorus alloy as described at about 600° F., since heating at such a temperature can be monitored and controlled to produce the desired results. For this alloy and at this temperature heating is generally carried out for about three hours. During heating at the temperatures so specified a gradient will be produced within the layer 16. Some of the nickel in layer 16 will tend to migrate into the interstitial spaces in the structure of a normal aluminum substrate 12. This will tend to have the effect of creating a firm bond holding the layer 16 in place upon the substrate 12. Also during such heating some of the phosphorus present will tend to migrate to a degree so as to create a surface 22 on the layer 18 which is relatively rich in phosphorus present in the form of a nickel phosphide. As a result of such heating the initial amorphous nickel phosphorus deposit is converted into a tough abrasion resistant, semi-glossy, semi-crystalline magnetic layer which if struck with a forceful blow will powder only in the immediate area of the force of the blow. Similar effects are achieved with the other alloys discussed in the previous section.

This conversion of a nickel-phosphorus or similar layer is accompanied by an important change which can be utilized in determining if desired physical properties have been achieved in the support layer 16. This technique is related to the fact that nickel-phosphorus alloys containing the percentages of materials indicated in the preceding and other alloys falling within the scope of the alloys indicated in the preceding which can be magnetic in character will develop magnetic characteristics as the result of the heat treatment specified. Such magnetic characteristics are a consequence of the desired change in physical state or form producing the physical hardness and resistance to abrasion desired with the invention. This change can be detected with common laboratory instruments such as a B-H loop tester.

In general, the time to develop these physical characteristics and magnetic properties will be shorter with a thick film or layer than with a thin film or layer. Hence, if the layer 16 is undesirably thin an undesirably long period may be required to develop the desired properties at any specific temperature. Similarly if the layer 16 is undesirably thick the time required at such a specific temperature may be so short that it is relatively difficult to accurately control the development of uniform characteristics throughout a layer such as the layer 16.

From the preceding it will be apparent that the presence or absence of desired physical "toughness" can be readily determined with nickel-phosphorus and similar electroless deposits by determining if these deposits have been altered by heating to a sufficient extent to have magnetic properties.

Generally it is desirable to have a phosphorus content within the nickel phosphorus alloy of layer 16 maximized. To achieve this an electroless bath using standard reagents and compositions as are known in the art is used. However, the pH, the rate of plating, and the temperature of the plating bath are strictly controlled. Further, the electroless bath solutions are maintained rich with respect to the alloying element. The electroless bath will be maintained at a pH of about 3.7 to about 3.9, and the temperature will be maintained at about from about 110° F. to about 180° F. The nickel phosphorus alloy will be plated at a rate of about three microinches per minute to about two microinches per minute. A more preferred rate would be at a rate of about one microinch per minute to about 1.5 microinches per minute at about 180° F.

The layer 16 may be created as a single deposit during a single electroless plating operation or it can be formed by depositing a series of successive deposits by electroless deposition. The use of the latter step-wise plating technique is considered desirable since it permits a complete or composite deposit which is somewhat richer in the alloying element used and which is somewhat more uniform in character than if a layer such as the layer 16 is created by a single electroless deposition operation. The reasons for this pertain to the fact that during a single electroless deposition operation in which nickel and phosphorus are co-deposited, the composition of the deposit varies in accordance with the time interval during which the deposit is formed.

Once a layer such as the layer 16 has been produced the shield layer 18 indicated in the preceding should be created on it. In effect this shield layer 18 serves two purposes. One of these is to mechanically separate the support layer 16 from the alloy layer 20 under conditions of use of the member 10. The second is to provide a surface 24 which will be readily adhered to by the alloy layer 20. This layer 18 may be created in any known, conventional manner such as for example by conventional electroless and electroplating. Because of the function of this layer 18 it should be formed of a metal or metal alloy which is both nonferrous and nonmagnetic. Further, it should be inert relative to the support layer 16 and the alloy layer 20 as it is deposited and during the use of the member 10. This layer 18 should, however, be metallic so that it will operate as a shield to reflect back signals from a recording head so that such signals will not magnetize any part of the layer 16.

It will be realized from this that virtually any conveniently used metal or metal alloy can be utilized to create the layer 18. It is preferred to utilize precious metals such as gold, silver, or platinum or various semi-precious metals such as copper having physical properties which are related to those of the precious metals, for the shield layer 18. It is considered that metallic nickel is sufficiently inert so that it can also be utilized in forming this shield layer 18. Additionally, alloys of metal such as electroless nickel alloyed with about six percent to about 14 percent phosphorus can be used.

Preferably the shield layer 18 is no thinner than about five microinches in thickness, since if it were thinner there would be the possibility that it would not be a continuous layer free from surface irregularities such as holes. The shield layer 18 is preferably no greater than about 80 microinches. Because of the composition of the shield layer 18 there is a reasonable possibility that an abrasive force applied to the recording alloy layer 20 might cause physical deformation of the layer 18 if it is unduly thick. Such deformation would, of course, affect the desired flatness and regularity of the recording layer 20. In general, the layer 18 should be just sufficiently thick so as to be a continuous layer free from physical irregularities.

Because by the instant process it is possible to produce layer 16 within exact tolerances and having properties such that the layer 16 does not have to be unduly thick and therefore extremely magnetic, it is possible to minimize the thickness of the shield layer 18. That is to say, by maintaining the support layer 16 below 800 microinches and preferably below 600 microinches an unduly thick shield layer 18 is not required.

The final magnetic recording alloy layer 20 used with the invention can be created in various ways which are well known to the art. For this reason it is considered unnecessary to discuss this layer 20 in any significant detail in this specification. In general effective magnetic recording alloys which can be utilized in the layer 20 will contain from about 50 to about 97 percent by weight cobalt and from about three to about 50 percent nickel and, if other secondary ingredients are present, from about three to about 50 percent by weight of nickel and such secondary ingredients. A particularly suitable alloy for use in creating the layer 20 contains about 70 percent by weight cobalt and about five percent by weight phosphorus and about 25 percent by weight nickel.

A layer such as the layer 20 should normally be from about 14 to about 20 microinches thick. On occasion however, magnetic recording alloy layers such as the layer 20 can be from about three to about 100 microinches thick. The thickness of such a layer 20 will normally be primarily determined by the nature of the equipment to be utilized with the member such as the member 10. In general thin films are normally desired for prompt response during use. In general the higher the frequency of the signal supplied by a recording head (not shown) the more desirable it is to utilize a recording alloy layer which is thin and conversely in general, if the frequency of the signal is relatively low the more desirable it is to use a comparatively thick recording alloy layer.

It is considered significant with the invention that the supporting layer 16 can be and preferably is of a magnetic character. In the past it has been conventional to try and avoid locating a magnetic recording alloy layer upon a magnetic material. It is believed that the reason for this will be apparent from a consideration of the fact that if the magnetic recording alloy layer were located directly upon a magnetic layer that the lower of the two layers would affect the utilization of the magnetic recording layer for its intended purposes. With the present invention this result is avoided because the shield layer 18 in effect isolates the support layer 16 from the alloy layer 20.

This shield layer 18 will normally tend to reflect back to the recording alloy layer 20 any signal applied to the alloy layer 20. As a consequence of this the support layer 18 is isolated or located so that the magnetic properties of this layer 18 do not affect the operation of the recording layer 20 as the member 10 is used.

This support layer 18 does, however, physically affect the entire member 10 by providing a physically strong, comparatively highly stressed surface or base serving as a support for the recording alloy layer 20. When the recording alloy layer 20 is subject to physical abrasion such as might cause scratch formation the shield layer 18 effectively tends to oppose scratches being created because of its hardness. Further, this support layer 16 effectively tends to minimize furrow formation in the event of such scratching. When the member 10 is scratched the scratch created will tend to be distinct. In effect such a scratch normally may be referred to as a "clean cut" in the various layers on this member 10.

We claim:

1. A process of preparing magnetic recording members which comprises:
   electrolessly depositing upon an aluminum substrate an amorphous nonmagnetic layer;
   said amorphous nonmagnetic layer comprising nickel alloyed with an alloying element chosen from the group consisting of phosphorus, boron, cobalt, and tungsten;
   said amorphous nonmagnetic layer deposited in an electroless bath which is maintained rich with respect to said alloying element;
   heating said substrate and said amorphous nonmagnetic layer at from about 500° F. to about 620° F. for about one hour to about eight hours to convert said amorphous nonmagnetic layer of said nickel alloy into a hard, semi-crystalline magnetic support layer;
   said support layer being richer in nickel near the interface of said substrate and said support layer and richer in the alloying element distal said interface of said substrate and said support layer;
   plating said support layer with a nonferrous, non-ferromagnetic shield layer;
   plating said shield layer with a nonmagnetic recording layer;
   heating said substrate, support layer, shield layer and recording alloy layer at from about 500° F. to about 600° F. for about one to about three hours to convert said nonmagnetic recording layer to a magnetic recording layer.

2. The process of claim 1 wherein:
   said amorphous, nonmagnetic layer is heated from about 550° F. to about 600° F. for about one hour to about three hours;
   said support layer is plated with a nonferrous, nonferromagnetic shield layer chosen from the group comprising gold, silver, copper, and electroless nickel in an electroless bath;
   said shield layer is from about five microinches to about 80 microinches thick;
   said magnetic recording layer is from about two microinches to about 30 microinches thick.

3. The process of claim 2 wherein:
   said amorphous, noncrystalline layer is heated at 600° F. for three hours;
   said amorphous, noncrystalline layer consists of nickel alloyed with about six to about 13 percent phosphorus;
   said support layer is from about 300 microinches to about 600 microinches;
   said nonmagnetic recording layer consists of alloys containing from about 50 to about 97 percent by weight cobalt, from about three to about 50 percent by weight nickel, and from zero to about 10 percent by weight secondary ingredients;
   said electroless bath for plating said amorphous nonmagnetic layer has a pH of from about 3.7 to about 3.9 and said amorphous nonmagnetic layer is deposited at a rate at from about 13 to about 2 microinches per minute and said electroless bath is maintained from about 170° F. to about 180° F.

4. The process of claim 2 wherein:
   said electroless nickel comprises nickel alloyed with from about six percent to about 14 percent phosphorus;
   said shield layer is gold;
   said amorphous, nonmagnetic layer is deposited at a rate at about 1.0 to 1.5 microinches per minute and said electroless bath is maintained at about 180° F.;
   said nonmagnetic recording layer consists of an alloy containing about 70 percent by weight cobalt and about 25 percent by weight nickel and about five percent by weight phosphorus;
   said substrate, said support layer, said shield layer and said nonmagnetic recording layer are heated at about 550° F. for about 1.5 hours.

5. The process of claim 1 wherein:
   said amorphous, nonmagnetic layer is electrolessly deposited upon said aluminum substrate as a single, continuous layer is an electroless bath which is continuously enriched with said alloying element.

6. The process of claim 1 wherein:
   said amorphous, nonmagnetic layer is deposited electrolessly upon said aluminum substrate in at least two layers.

7. The process of claim 2 wherein:
   said amorphous, nonmagnetic layer is deposited electrolessly upon said aluminum substrate in at least two layers and said layers are removed from said electroless depositing bath after each said layer is deposited and said preceding layer is treated by polishing to remove any surface irregularities before a subsequent layer is deposited and, each layer is deposited in an electroless bath and re-enriched in said alloying element.

8. In a process of manufacturing a magnetic recording disk in which a plurality of layers are successfully located upon an aluminum disk serving as a substrate the improvement which comprises:

depositing the first of said layers upon said substrate by electroless deposition of an amorphous, nonmagnetic nickel alloy containing as great a proportion of an alloying element selected from the group consisting of boron and phosphorus as can be codeposited with nickel by electroless deposition in a thickness sufficient to provide a layer which when subsequently treated will be continuous and physically strong enough to prevent damage to said substrate during the use of said recording disk, heating said substrate and said first layer at a temperature between 500° and 620° F. for a time sufficient to concurrently (1) convert said amorphous deposit to a semi-crystalline layer having a magnetic response which is of such a character that it will form a powder and which will not crack or shatter into sharp pieces when contacted by such a recording head during the use of said disk, and (2) to modify the composition of said deposit and to bond said deposit to said substrate by the diffusion of said nickel into said substrate, said temperature being sufficiently low so as to prevent any warpage of said substrate, depositing a shield layer of a metal which will reflect magnetic signals upon said first layer so as to completely cover said first layer, said shield layer being deposited in a thickness sufficient to reflect magnetic signals used during the use of said disk so as to prevent said signals from reaching said first layer during the use of said disk, creating a recording layer upon said shield layer; and carrying out the steps in the production of said disk without heating said disk during its manufacture to a temperature greater than 620° which would cause physical deformation of said substrate.

9. A magnetic recording disk produced by the process defined in claim 8.

10. A magnetic recording disk produced by the process defined in claim 2.

11. A magnetic recording disk produced by the process defined in claim 5.

12. A magnetic recording disk produced by the process defined in claim 7.

13. The process of claim 1 wherein:

said amorphous nonmagnetic layer is from about 50 to about 800 microinches thick.

14. In a process for manufacturing the substrate and support layer of a magnetic recording disk of the type having an aluminum substrate and a support layer located on the aluminum substrate and a plurality of other layers sandwiched one upon the other on the support layer the improvement which comprises:

depositing said support layer upon said substrate by electroless deposition of an amorphous non-magnetic alloy containing as great a portion of an alloying element selected from the group consisting of boron and phosphorus as can be codeposited with nickel by electroless deposition in a thickness from about 50 microinches to about 800 microinches;

heating said substrate and said support layer at a temperature below 620° F. for a time sufficient to concurrently (1) convert said amorphous deposit to a semicrystalline layer having a magnetic response and (2) to modify the composition of said deposit and to bond said deposit to said substrate by the diffusion of said nickel into said substrate.

15. The process of claim 14 wherein:

said thickness of said substrate is from about 300 microinches to about 600 microinches.

* * * * *